Patented May 9, 1939

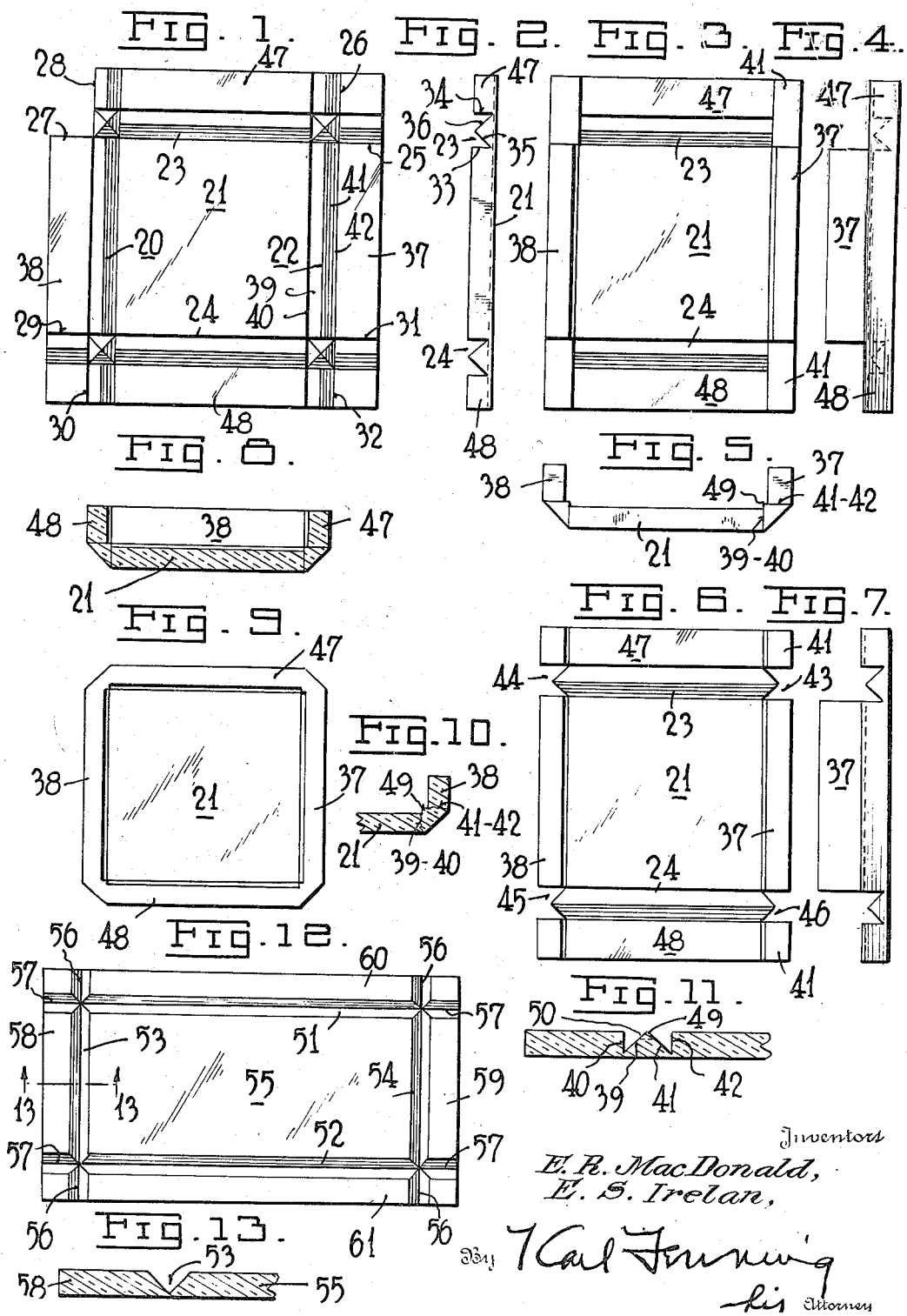

2,157,794

UNITED STATES PATENT OFFICE 2,157,794

MAKING RECEPTACLES

Edmund R. MacDonald, Attleboro Falls, and Ellison S. Irelan, North Attleboro, Mass., assignors to Evans Case Company, North Attleboro, Mass., a corporation of Massachusetts Application December 18, 1937, Serial No. 180,664

10 Claims. (Cl. 18—56)

The invention relates to the manufacture of receptacles from plastics, particularly such as Celluloid, cellulose nitrate, cellulose acetate, etc., or the like. It has been customary to mold such receptacles from the soft plastics or make them from separate pieces of plastic but this is expensive, uncertain, difficult and frequently inconvenient. The present invention intends to make from a sheet of plastic a receptacle which may have the characteristics of a molded receptacle but which may be easier and cheaper to produce and more convenient for manipulation and manufacture. To this end a flat sheet of plastic may be employed. The sheet will preferably be in width a little more than equivalent to the sum of the width of the bottom or base plus the heights of the sides. The sheet will preferably be in length a little more than equivalent to the sum of the length of the bottom or base and the heights of the ends of the completed receptacle. Such a sheet having been procured the base of the receptacle will be outlined or scored on the sheet by cutting into it grooves extending part way but not entirely through the sheet, the grooves being preferably continued to the margins of the sheet. The sheet may be bent up at the grooves then, after removing excess corner portions. By means of applying a solvent to the material at the grooves the material may be softened and caused to adhere and amalgamate at the joints and where the parts come in contact with each other. This closes the joints and holds the members in the adjusted position producing a receptacle which has the characteristics of a molded article since the plastic by means of the solvent is caused to make the material substantially integral across the joining seams. Since the grooves are not cut entirely through the sheet, when the portions are turned up the angle joint is bound by the outer portion of the sheet which has maintained its original integrity. In order to assist in bending the sheet and to prevent it from breaking or cracking the plastic may be heated along the bending line. In order to limit the extent of the heating and insure the bending being performed at the proper place the plastic sheet may be slightly bent before applying the heat and then the heat may be applied along the bent line to soften the plastic and make it more readily and easily deformed without cracking or splitting.

The exact form of the sheet of plastic used and of the grooves made in it and of the final receptacle may vary within wide limits. In the accompanying drawing are shown specific embodiments of the invention in such a way as to disclose clearly the details of manipulation and procedure. Figure 1 is a plan view of a sheet of plastic in which have been cut a set of grooves one corner being removed. Fig. 2 is a side elevation of the sheet of plastic of Fig. 1. Fig. 3 is a plan view of the sheet of plastic of Fig. 1, after it has been partially bent into shape. Fig. 4 is a side elevation of the structure illustrated in Fig. 3. Fig. 5 is an end elevation of Fig. 3. Fig. 6 is a plan view of the structure of Fig. 3 after it has been further prepared for bending or folding. Fig. 7 is a side elevation of the structure illustrated in Fig. 6. Fig. 8 is a section through the finished receptacle in a direction at right angles to Fig. 5. Fig. 9 is a plan view of the finished receptacle. Fig. 10 is a fragmentary section illustrating the effect of the plastic at a bend or joint. Fig. 11 is a fragmentary section illustrating an optional procedure. Fig. 12 is a plan view of a sheet of plastic illustrating an optional procedure. Fig. 13 is a fragmentary section on the line 13—13 of Fig. 12.

A sheet of plastic of any suitable shape may be employed. In Fig. 1 is illustrated a square sheet of plastic in which is cut a double groove 20 at the left side of the central portion 21 which is to become the base of the final receptacle. At the right side of the base portion 21 is cut a similar double groove 22; at the top of the base member 21 is cut a similar double groove 23 and at the bottom of the base member 21 is cut a similar double groove 24, the grooves 20, 22, 23 and 24 are extended beyond the sides of the base member 21 to the edges of the sheet. The grooves may be produced by milling, shaving or any other similar method. The corners of the sheet are then cut out and entirely removed. Thus the corner between the line 25 of the groove 23 and the line 26 of the groove 22 is removed. Similarly the corner between the line 27 of the groove 23 and the line 28 of the groove 20 is removed as is the corner between the line 29 of the groove 24 and the line 30 of the groove 20. Likewise the corner between the line 31 of the groove 24 and the line 32 of the groove 22 is removed. Only the corner between the lines 27 and 28 is omitted from the drawing.

The shape of a preferred form of groove is indicated in the side view of Fig. 2. The groove 23 for instance consists of an inner vertical side wall 33 and an outer vertical side wall 34 between which are cuts 35 and 36 at right angles to each other and joining the lines 33 and 34 toward the bottom or under side of the sheet of plastic. The grooves 20, 22 and 24 are of similar form throughout the structure illustrated in Figs. 1 to 9.

Suitable solvent may be applied to the grooves 20, 22, 23 and 24. Acetone may be painted on the grooves as a solvent when the sheet is of celluloid. This will tend to make the plastic along these grooves soft and ready to amalgamate with any portion with which they come in contact.

The sheet may then be bent by bringing the side members 37 and 38 at right angles to the base member 21. This movement will cause the face 39 of the groove 22 to come in contact with the inner wall 40 of the groove 22. The wall 41 of the groove 22 will thus be brought to rest in a horizontal position and on it will lie the wall 42 of the groove 22. Similar operation in the groove 20 will thus cause the side members 37 and 38 to lie vertically at right angles to the base section 21 as illustrated in Fig. 5. Since the corners of the plate have been removed the side walls 37 and 38 do not extend beyond the ends of the base member 21. In order to prepare the blank for further bending a portion of the bent-up wall 41 in Fig. 6 and similar portions 44, 45 and 46 are cut out near the other corners of the blank. This makes it possible to bend the plastic at the grooves 23 and 24 so as to bring the walls of these grooves into contact with each other and to bring the end members 47 and 48 to a vertical position or a position at right angles to the member 21 in such a way that the end of the face 41 of the groove 22 comes in contact with the end of the side wall 37 and because of the application of the solvent it engages, adheres, coheres, coalesces and amalgamates therewith. A similar contact and amalgamation is made at the other end of the side wall 37 and at both ends of the side wall 38.

In Fig. 10 is illustrated diagrammatically the effect of the solvent on the plastic at the meeting points. The meeting lines 41, 42 and the meeting lines 39, 40 being indicated in light wavy lines to show that they substantially disappear as the contacting portions of the plastic treated with the solvent adhere and coalesce. The material at all the joints becomes homogeneous upon evaporation of the solvent.

It may be desirable to apply the solvent to the grooves one after another and as each is bent but the invention is not limited to any specific order in carrying out the various steps followed.

It will be noted that since the grooves 20, 22, 23 and 24 stop short of the inside of the blank the integrity of the plastic is not interfered with at the four sides of the base member 21 on that side of the sheet which becomes the outside of the final receptacle indicated in Fig. 9.

In order to facilitate the bending without liability of cracking or splitting or otherwise deteriorating the portion of the sheet which lies below the cut grooves the sheet on that side along the bottoms of the grooves may be slightly heated or if it is desired to more carefully localize the heat the sheet may be slightly bent, for instance at the junction of the wall 40 and the wall 39, and then heat may be applied merely along the line formed by the bend to heat the plastic and allow the bend to be fully completed. Similar procedure may be repeated on each of the lines on which the bend is made. After the sheet has been bent into the form of the receptacle it may be rigidly held with the parts in contact and may, if desired, be placed in a press or other molding device to insure the adherence and coalescence of the plastic along the contact lines at the bends.

It will be noted that the outer lines of the cuts 20, 22, 23 and 24 are vertical while the inner lines are diagonal. Thus in Fig. 2 the lines 33 and 34 are vertical and the lines 35 and 36 are diagonal. The diagonal lines 35 and 36 are thus slightly longer than the lines 33 and 34 so that when the bend is made, and the line 34 comes on the line 36 while the line 33 comes on the line 35, the point of the triangle between the lines 35 and 36 may extend slightly into the corner of the receptacle. This is indicated at 49 in Fig. 5 with respect to the bend on the cut groove 22. It will be understood of course that this condition exists in all four of the grooves and there will then be a slight bead, angle or projection at the inside corners of the receptacle. When this is undesirable it may be avoided by cutting the angular member shorter by the procedure indicated in Fig. 11, in which the point 49 between the walls 39 and 41 is indicated as cut off along the dotted line 50 thus bringing what is left of the line 39 to substantially the same length as the line 40 and the remainder of the line 41 to substantially the same length as the line 42. Thus when the parts are bent into position to form the receptacle instead of having the projection 49 the corners of the receptacle will be a smooth bevel, fillet or core 50.

By the use of the double groove as illustrated there is produced a box or receptacle which has beveled or mitered outer corners as indicated in Figs. 5, 8 and 9. It is possible, however, to employ the invention in a simpler form. Thus as illustrated in Figs. 12 and 13 the sheet of plastic is cut not by double grooves but by a single groove 51, 52, 53 and 54 at each edge of the base member 55. The corners of the sheet may be cut out along the bottom lines of the grooves such as 56 and 57. Solvent may then be applied to the cut grooves and the end members 58 and 59 and the side members 60 and 61 may be turned vertically or at right angles to the base member 55 when the contacting portions will adhere and coalesce to form the finished receptacle. If desired the uncut portion of the plastic sheet at the bottoms of the grooves 51, 52, 53 and 54 may be heated before bending or after slight bending so as to facilitate the final formation of the receptacle without injuring or damaging the skin of the plastic material.

The present invention has advantages over manufacture of receptacles from separate pieces of plastic. The receptacle is made of one piece of plastic instead of five. The proper smooth alignment of sides with the bottom is automatic and always exact since there is no possibility of misplacement or slipping. It is impossible to place a wrong piece for a side wall. The bottom corners have continuous pieces of material on their outer sides. All this produces a neater, more exact product which needs much less expensive finishing.

In describing the receptacle the terms bottom and sides have been employed as convenient means of identifying parts of the device and not as limitations. The finished article may be used for a top or cover or in any way and for any purpose.

For other shapes of receptacles other forms of plastic sheets may be employed and the cut grooves may be of other types and otherwise arranged, the specific forms and relative sizes of the parts here given being for illustrative purposes only and not as limitations upon the invention disclosed.

We claim as our invention:

1. The method of forming receptacles from sheets of plastic comprising cutting partially through the sheet double grooves crossing each other said grooves having internal walls at right angles to each other and shorter external walls at right angles to the surface of the sheet, removing corner pieces formed beyond the grooves, bending the sheets at some of the grooves so that the longer walls contact the shorter walls, removing parts of the bent portions at the junctions of the grooves, and bending at other grooves to bring the longer walls into contact with the shorter walls all without substantially fracturing the material.

2. The method of forming receptacles from sheets of plastic comprising cutting partially through the sheet double grooves crossing each other said grooves having internal walls at right angles to each other and shorter external walls at right angles to the surface of the sheet, removing a portion of the material enclosed by the walls at right angles so as to reduce the height of the walls, removing corner pieces formed beyond the grooves, bending the sheets at some of the grooves so that the longer walls contact the shorter walls, removing parts of the bent portions at the junctions of the grooves, and bending at other grooves to bring the longer walls into contact with the shorter walls all without substantially fracturing the material.

3. The method of forming receptacles from sheets of plastic comprising cutting partially through the sheet double grooves crossing each other said grooves having internal walls at right angles to each other and shorter external walls at right angles to the surface of the sheet, removing corner pieces formed beyond the grooves, applying a solvent to the faces of some of the grooves, bending the sheets at said grooves so that the longer walls contact the shorter walls so as to make them adhere and coalesce, removing parts of the bent portions at the junctions of the grooves, applying a solvent to the faces of other grooves, and bending at said other grooves to bring the longer walls into contact with the shorter walls so as to make them adhere and coalesce all without substantially fracturing the material.

4. The method of forming receptacles from sheets of plastic comprising cutting partially through the sheet double grooves crossing each other said grooves having internal walls at right angles to each other and shorter external walls at right angles to the surface of the sheet, removing a portion of the material enclosed by the walls at right angles so as to reduce the height of the walls, removing corner pieces formed beyond the grooves, applying a solvent to the faces of some of the grooves, bending the sheets at said grooves so that the longer walls contact the shorter walls so as to make them adhere and coalesce, removing parts of the bent portions at the junctions of the grooves, applying a solvent to the faces of other grooves, bending said other grooves to bring the longer walls into contact with the shorter walls so as to make them adhere and coalesce all without substantially fracturing the material.

5. The method of forming receptacles from sheets of plastic which softens on heating comprising cutting grooves partially through the sheet of plastic, removing corner pieces formed beyond the grooves, applying a solvent to the faces of the grooves, heating the sheet substantially only below the grooves to soften the plastic, and bending the sheet to cause the faces of the grooves to engage each other and cohere, all without substantially fracturing the material.

6. The method of forming receptacles from sheets of plastic which softens on heating comprising cutting grooves partially through the sheet of plastic, removing corner pieces formed beyond the grooves, applying a solvent to the faces of the grooves, bending the sheet slightly at the uncut portion below the grooves, heating the sheet substantially only at the lines of the bends to soften the plastic, and further bending at the grooves so as to bring the solvent treated faces of the grooves into engagement with each other and forcing them together so as to make them adhere and coalesce, all without substantially fracturing the material.

7. The method of forming receptacles from sheets of plastic which softens on heating comprising cutting grooves partially through the sheet of plastic, removing corner pieces formed beyond the grooves, heating the sheet substantially only below the grooves to soften the plastic, and bending the sheet to cause the faces of the grooves to engage each other, all without substantially fracturing the material.

8. The method of forming receptacles from sheets of plastic which softens on heating comprising cutting grooves partially through the sheet of plastic, removing corner pieces formed beyond the grooves, bending the sheet slightly at the uncut portion below the grooves, heating the sheet substantially only at the lines of the bends to soften the plastic, further bending at the grooves so as to bring the faces of the grooves into engagement with each other, all without substantially fracturing the material.

9. The method of forming receptacles from sheets of plastic which softens on heating comprising cutting partially through the sheet double grooves crossing each other said grooves having internal walls at right angles to each other and shorter external walls at right angles to the surface of the sheet, removing corner pieces formed beyond the grooves, bending the plastic slightly at some of the grooves, heating the sheet substantially only at the lines of the bends to soften the plastic, further bending at the said grooves so that the longer walls contact the shorter walls, removing parts of the bent portions at the junctions of the grooves, bending slightly at other grooves, heating the sheet substantially only at the lines of the last mentioned bends to soften the plastic, further bending at the last mentioned grooves to bring the longer walls into contact with the shorter walls, all without substantially fracturing the material.

10. The method of forming receptacles from sheets of plastic which softens on heating comprising cutting partially through the sheet double grooves crossing each other said grooves having internal walls at right angles to each other and shorter external walls at right angles to the surface of the sheet, removing a portion of the material enclosed by the walls at right angles so as to reduce the height of the walls, removing corner pieces formed beyond the grooves, bending the sheets slightly at some of the grooves, heating the sheet substantially only at the lines of the bends to soften the plastic, further bending at the said grooves so that the longer walls contact the shorter walls, removing parts of the bent portions at the junctions of the grooves, bending slightly at other grooves, heating the sheet substantially only at the lines of the last mentioned bends to soften the plastic, further bending at the last mentioned grooves to bring the longer walls into contact with the shorter walls, all without substantially fracturing the material.

EDMUND R. MacDONALD.
ELLISON S. IRELAN.